US012315663B2

(12) United States Patent
Iso et al.

(10) Patent No.: US 12,315,663 B2
(45) Date of Patent: May 27, 2025

(54) INDUCTOR

(71) Applicant: Murata Manufacturing Co., Ltd., Kyoto-fu (JP)

(72) Inventors: Eiji Iso, Nagaokakyo (JP); Yuki Kitashima, Nagaokakyo (JP); Yoshiharu Satou, Nagaokakyo (JP); Noriyuki Ookawa, Nagaokakyo (JP); Hiroshi Marusawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 832 days.

(21) Appl. No.: 17/494,629

(22) Filed: Oct. 5, 2021

(65) Prior Publication Data

US 2022/0108824 A1 Apr. 7, 2022

(30) Foreign Application Priority Data

Oct. 5, 2020 (JP) ................................ 2020-168438
Oct. 5, 2020 (JP) ................................ 2020-168439

(51) Int. Cl.

| | |
|---|---|
| ***H01F 27/02*** | (2006.01) |
| ***H01F 1/12*** | (2006.01) |
| ***H01F 27/255*** | (2006.01) |
| ***H01F 27/28*** | (2006.01) |
| ***H01F 27/29*** | (2006.01) |
| ***H01F 41/02*** | (2006.01) |

(52) U.S. Cl.

CPC ............ *H01F 27/022* (2013.01); *H01F 1/12* (2013.01); *H01F 27/255* (2013.01); *H01F 27/2823* (2013.01); *H01F 27/292* (2013.01); *H01F 41/0246* (2013.01)

(58) Field of Classification Search

CPC ........ H01F 27/022; H01F 1/12; H01F 27/255; H01F 27/2823; H01F 27/292; H01F 41/0246; H01F 1/26; H01F 2017/048; H01F 17/04

See application file for complete search history.

(56) References Cited

U.S. PATENT DOCUMENTS

2016/0086714 A1* 3/2016 Moon .................. H01F 27/292 336/200
2017/0084376 A1* 3/2017 Kubota ............... H01F 17/0006
2017/0323725 A1* 11/2017 Iso ........................ H01F 27/292
2018/0308609 A1* 10/2018 Shinohara ................. H01F 1/26
2018/0308613 A1* 10/2018 Ishida ................. H01F 27/2852
2020/0118729 A1* 4/2020 Lim ...................... H01F 27/324

FOREIGN PATENT DOCUMENTS

JP 2018-182210 A 11/2018

* cited by examiner

*Primary Examiner* — Mang Tin Bik Lian
(74) *Attorney, Agent, or Firm* — Studebaker Brackett PLLC

(57) ABSTRACT

An inductor includes a body containing soft magnetic powder and resin, a coil embedded in the body, outer electrodes on the body, and a protective film on the surface of the body. The protective film has a thickness of 10 μm or more and contains silica particles and resin. In the protective film, the silica particles have an average diameter of 15 nm to 75 nm, and the percentage by weight of the silica particles to the resin is between 150% and 250%.

16 Claims, 17 Drawing Sheets

| | | METALLURGICAL MICROSCOPE IMAGE | Sz (MAXIMUM HEIGHT) |
|---|---|---|---|
| LT PLANE | AFTER SHAPING |  | 25 μm |
| | AFTER GRINDING |  | 50 μm |
| WT PLANE | AFTER SHAPING |  | 28 μm |
| | AFTER GRINDING |  | 43 μm |

INDUCTOR

CROSS-REFERENCE TO RELATED APPLICATIONS

This application claims benefit of priority to Japanese Patent Application No. 2020-168438, filed Oct. 5, 2020, and to Japanese Patent Application No. 2020-168439, filed Oct. 5, 2020, the entire content of each is incorporated herein by reference.

BACKGROUND

Technical Field

The present disclosure relates to an inductor.

Background Art

Japanese Unexamined Patent Application Publication No. 2018-182210 discloses a coil component having a core that contains metal particles and a resin material, a coil conductor embedded in the core, and outer electrodes electrically coupled to the coil conductor. The coil component has a protective layer on its magnetic body.

This known coil component has room for further improvement in the quality of the protective layer.

SUMMARY

Accordingly, the present disclosure provide an inductor improved in the quality of the film that protects its body.

According to preferred embodiments of the present disclosure, an inductor includes a body containing soft magnetic powder and resin, a coil embedded in the body, outer electrodes on the body, and a protective film on a surface of the body. The protective film has a thickness of 10 μm or more and contains silica particles and resin. In the protective film, the silica particles have an average diameter of 15 nm to 75 nm, and a percentage by weight of the silica particles to the resin is between 150% and 250%.

The preferred embodiments of the present disclosure provide an inductor improved in the quality of the film that protects its body.

Other features, elements, characteristics and advantages of the present disclosure will become more apparent from the following detailed description of preferred embodiments of the present disclosure with reference to the attached drawings.

DETAILED DESCRIPTION

Overall Structure of the Inductor

Figure 1:
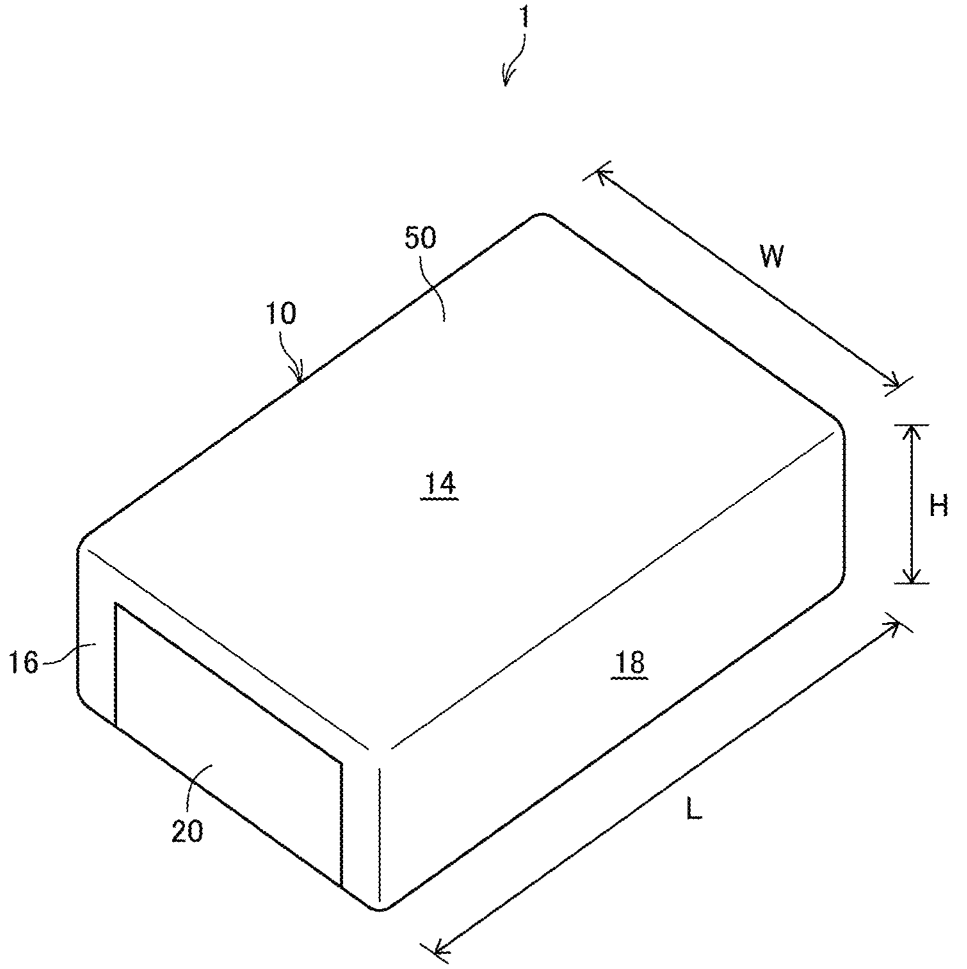
FIG. 1 is a diagram schematically illustrating the structure of an inductor according to an embodiment of the present disclosure, presenting a perspective view of the top side of the inductor.
Figure 2:
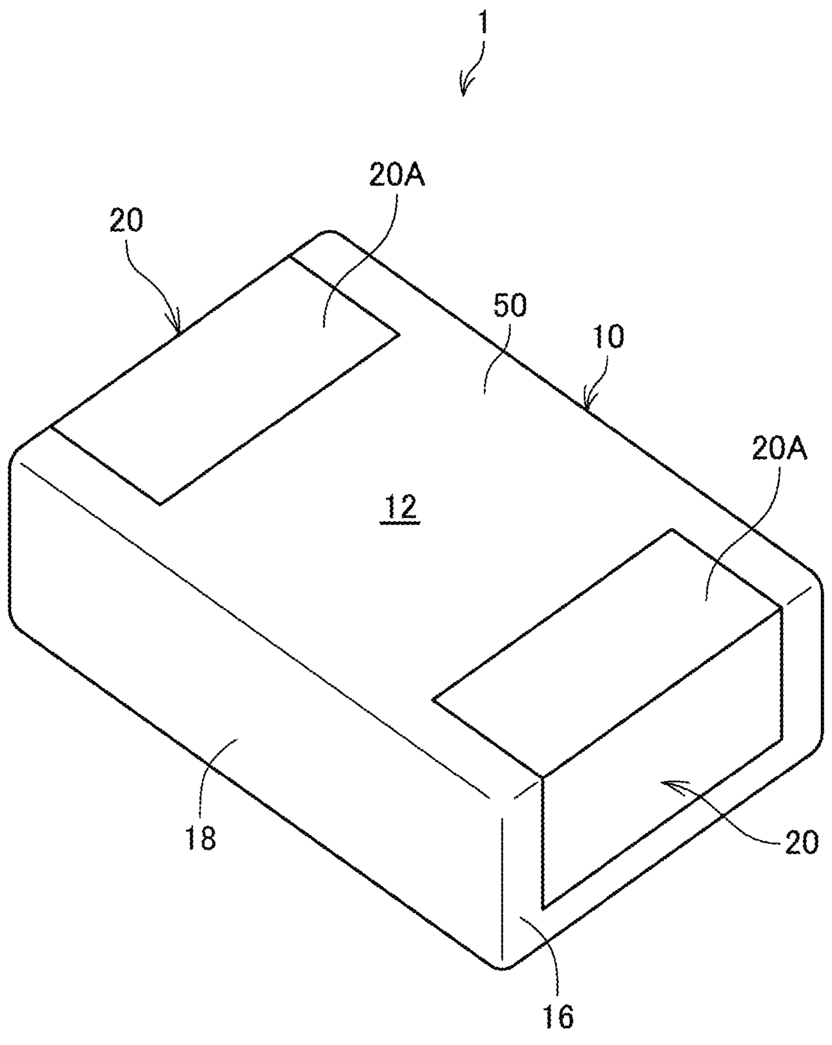
FIG. 2 is a diagram schematically illustrating the structure of the same inductor, presenting a perspective view of the mount surface side of the inductor.

FIGS. 1 and 2 are diagrams schematically illustrating the structure of an inductor 1 according to an embodiment. FIG. 1 is a perspective view of the top 14 side of the inductor 1, and FIG. 2 is a perspective view of the mount surface 12 side of the inductor 1.

Constructed as a surface-mount electronic component, the inductor 1 according to this embodiment has a substantially rectangular-parallelepiped body 10 and a pair of outer electrodes 20 on the surface of the body 10. One side of the body 10 is the mount surface 12 (FIG. 2), on which the body 10 is mounted on the surface of a circuit board (not illustrated). The body 10 is covered with a protective film 50 except where it has the outer electrodes 20 on.

The side of the body 10 opposite the mount surface 12 is the top 14 (FIG. 1). Of the four sides other than the mount surface 12 and the top 14, the pair of sides on which the body 10 has extensions 34 (described later) of a coil 30 are the first sides 16, and the other pair are the second sides 18. The first and second sides 16 and 18 can also be described as the sides of the body 10 located radially around the wound section 32 of the coil 30 (described later). The mount surface 12 and the top 14, opposite each other, are also referred to as the primary sides.

As illustrated in FIG. 1, the distance from the mount surface 12 to the top 14 is defined as the height H of the body 10. The length of the short side of the top 14 is defined as the width W of the body 10, and the length of the long side of the top 14 is defined as the length L of the body 10.

Figure 3:
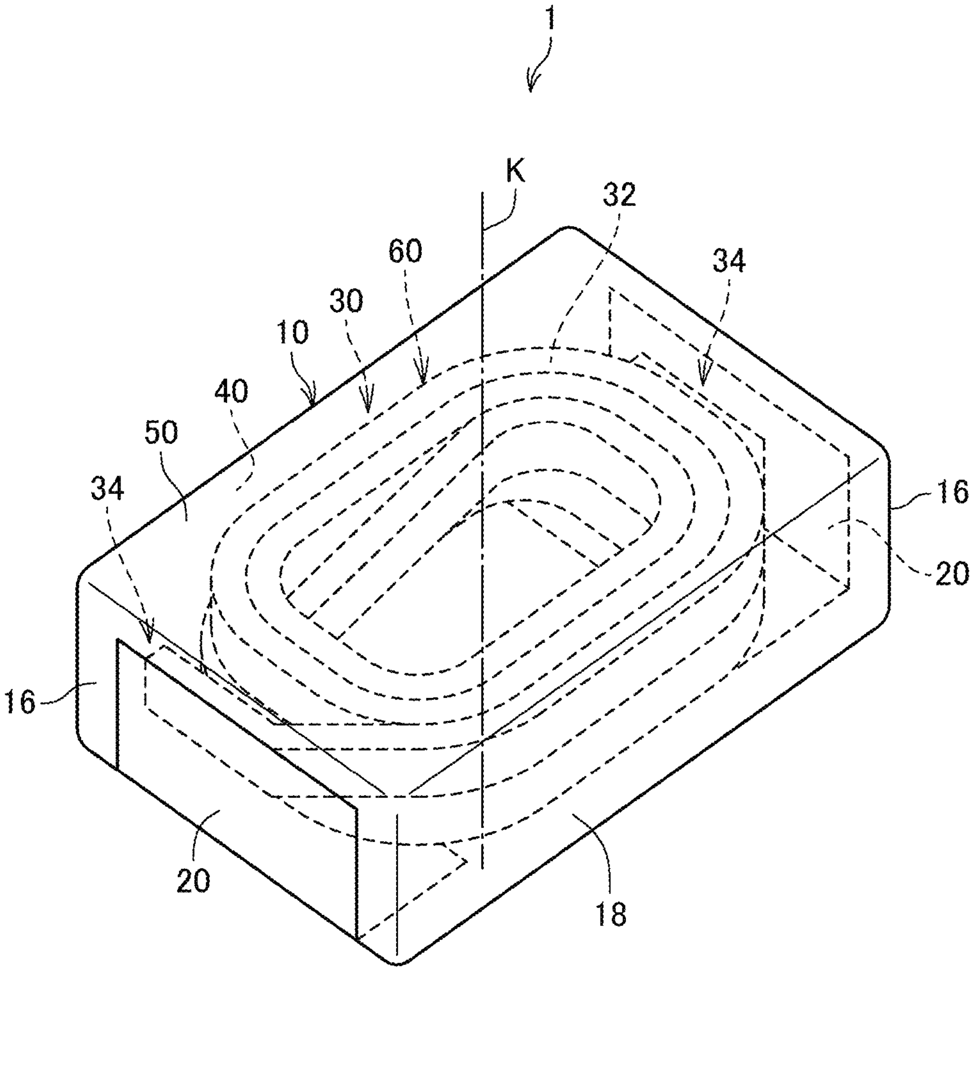
FIG. 3 is a perspective view of the internal structure of the same inductor.

FIG. 3 is a perspective view of the internal structure of the inductor 1 according to this embodiment.

The body 10 has a coil 30 and a core 40 in which the coil 30 is embedded; the body 10 is a magnetic component with a built-in coil, in which a coil 30 is built in a core 40.

The coil 30 is an air-core coil component, i.e., simply a coil of wire.

The core 40 is a substantially rectangular-parallelepiped article formed by shaping a mixture of soft magnetic powder and resins, or powder mix, by compression molding with the coil 30 therein.

The coil 30 has a wound section 32 formed by a length of wound wire and a pair of extensions 34 from the wound section 32. The wound section 32 is formed by winding a length of wire substantially into a spiral shape in such a manner that the wire will have both of its ends outside and be continuous inside. Inside the body 10, the coil 30 is embedded in the core 40 with the central axis K of its wound section 32 parallel with the height H of the body 10. The extensions 34 extend from the wound section 32 to the pair of first sides 16, one extension 34 to one side 16.

The wire forming the coil 30 has been covered with an insulating coating 60 that has an electrically insulating coating layer and a fuser coating layer on the coating layer. In the formation of the coil 30, the wire is heated while it is wound. The fuser coating layer melts, fastening together the portions of the wire forming the wound section 32. The wound section 32 of the finished coil 30, therefore, will not lose their shape easily. In addition, the insulating coating layer provides reliable electrical insulation between the coil 30 and the core 40.

The pair of outer electrodes 20 are substantially L-shaped elements extending from the first sides 16 of the body 10 to reach the mount surface 12, one electrode 20 from one side 16. Each of the outer electrodes 20 is coupled to one extension 34 of the coil 30 at one first side 16, and its portion 20A reaching the mount surface 12 (FIG. 2) is electrically coupled to wiring of a circuit board, for example by soldering.

An example of a use of an inductor 1 having such a structure is a coil for the impedance matching of a radiofrequency circuit (matching coil), for example in PCs, DVD players, digital cameras, TV sets, cellular phones, smartphones, automotive electronics, medical and industrial machinery, and other types of electronic equipment. These, however, are not the only possible applications of the inductor 1; it can be used in tuned circuits, filter circuits, rectifier/smoothing circuits, etc.

Overview of the Production of the Inductor

Figure 4:
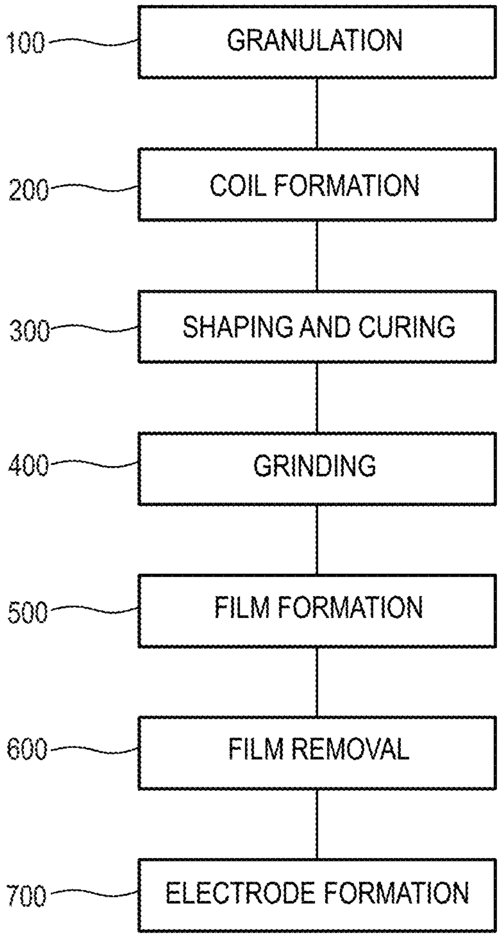
FIG. 4 is an outline of the production of an inductor.

FIG. 4 is an outline of the production of the inductor 1.

As illustrated, the production of the inductor 1 includes granulation (Step 100), coil formation (Step 200), shaping and curing (Step 300), grinding (Step 400), film formation (Step 500), film removal (Step 600), and electrode formation (Step 700).

First, a mixture of the soft magnetic powder and resins to be contained in the core 40 (hereinafter powder mix) is granulated (Step 100). The soft magnetic powder is a collection of particles having a surface coated with an insulating film.

Separately, a coil 30 is formed (Step 200) from a piece of wire covered with an insulating coating 60. To ensure the resulting coil 30 will have the aforementioned wound section 32 and pair of extensions 34, the wire is wound by the method called "a winding," a technique of winding in which the piece of wire, which will serve as a conductor, is wound substantially into a two-tier spiral shape in such a manner that the resulting coil 30 will have its starting and ending extensions 34 outside. The number of turns in the coil 30 is not critical. For example, the coil 30 may have about 6.5 turns.

Then an article that will later become the body 10 is shaped and cured (Step 300).

The material for the shaped article is the granulated powder mix.

Prior to this, the powder mix is shaped into tablets (solids in a predetermined shape). Putting the tablets and the coil 30 into a cavity in a mold and pressing them with a punch while heating the cavity will give a shaped article with the coil 30 therein. The cured article is removed from the cavity and polished. Barrel polishing will give the article rounded corners.

Figure 5:
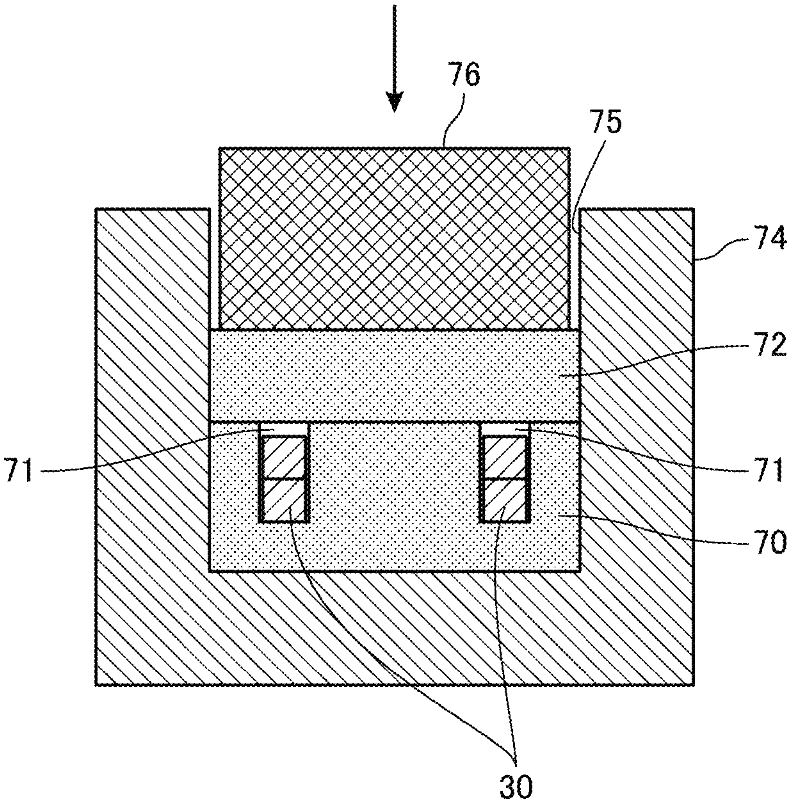
FIG. 5 is a diagram illustrating the shaping of a body from tablets of powder mix.

As illustrated in FIG. 5, two types of tablets are used: a first tablet 70 in an appropriate shape (e.g., substantially E-shaped) having a groove 71 for putting the coil 30 in, and a second tablet 72 in an appropriate shape (e.g., substantially I-shaped or flat-plate) that covers the groove 71 in the first tablet 70. In the compression molding, the first tablet 70 with the coil 30 slotted in the groove 71 and the second tablet 72 are stacked in the cavity 75 in the mold 74. The first and second tablets 70 and 72 are then heated and at the same time pressed with a punch 76 in the direction of stacking from the first tablet 70 or/and second tablet 72 side (in the example in FIG. 5, from the second tablet 72 side). This will combine the first tablet 70, coil 30, and second tablet 72 into a one-piece structure.

Alternatively, the granulated powder mix may be put directly into the cavity and shaped by compression molding.

Figure 6:
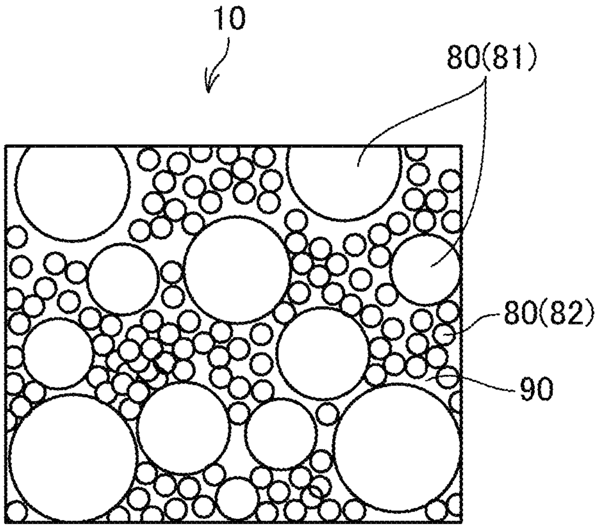
FIG. 6 is a schematic diagram illustrating the core of a shaped body.

Preferably, the pressure P for the compression molding is lower than usual so that the individual particles 80 forming the soft magnetic powder will not break but maintain their original shape in the shaped body 10 as illustrated in FIG. 6. This will limit damage to the insulating film on the surface of the individual particles 80 forming the soft magnetic powder, thereby limiting the associated lowering of the insulating performance (i.e., voltage resistance) of the film.

Preferably, the soft magnetic powder is a collection of two or more sets of particles 80 with different sizes as illustrated in FIG. 6 (in the example in FIG. 6, first soft magnetic particles 81 having a relatively large average diameter, or "larger particles," and second soft magnetic particles 82 having a relatively small average diameter, or "smaller particles"). Shaping such a soft magnetic powder by compression molding will give an article (body 10) densely packed with particles 80 of the powder because the smaller, second soft magnetic particles 82 penetrate between the larger, first soft magnetic particles 81 together with resin 90 as illustrated in FIG. 6 during the compression molding. Embodiments of the first and second soft magnetic particles 81 and 82 as a component of the core 40 will be described later.

Then the second sides 18 of the article are scraped away (i.e., ground) with an abrasive to a predetermined width W.

This will trim the body 10 to a predetermined width W. The trimming will reduce the distances between the coil 30 inside the body 10 and the second sides 18 (also referred to as the side gaps), thereby increasing the occupancy of the body 10 by the coil 30 in the radial direction with respect to the wound section 32 of the coil 30. Shaping the body 10 by compression molding and then grinding it (Step 400) to a predetermined size is advantageous over controlling the size of the body 10 by compression molding alone in terms of size variations between bodies 10.

Polishing (e.g., barrel polishing) may follow to round the corners of the second sides 18 produced by the grinding.

The entire surface of the body 10, now ground to a predetermined size, is then covered with a protective film 50.

The material for the protective film 50 is a thermosetting resin, such as an epoxy, polyimide, or phenolic resin, or thermoplastic resin, such as a polyethylene or polyamide resin. A resin containing filler, such as silicon oxide or titanium oxide, may also be used.

The material for the protective film 50 is applied to the entire surface of the body 10, for example by coating or dipping, and the applied material is cured to form a protective film 50.

The body 10, now entirely covered with the protective film 50, is then irradiated with a laser to remove the protective film 50 from the areas in which the outer electrodes 20 will be formed (hereinafter also electrode areas; in this embodiment, predetermined areas of the first sides 16 and mount surface 12) and also to remove the insulating coating 60 on the extensions 34 of the coil 30 exposed in the electrode areas.

After the laser-assisted removal of the insulating coating 60, etching may follow to clean the surface of the electrode areas.

Then outer electrodes 20 are formed by plating the electrode areas, from which the protective film 50 has been removed.

The outer electrodes 20 are formed by plating the soft magnetic powder and extensions 34 of the coil 30 exposed on the surface of the body 10 with a layer of copper (Cu).

On the copper (Cu) layer, nickel (Ni) and tin (Sn) plating layers may be stacked in this order. A layer of aluminum (Al), silver (Ag), gold (Au), or palladium (Pd) may be used instead of the layer of copper (Cu).

Outer electrodes formed by sputtering or sheets of electrically conductive resin or copper, for example, may also be used. The outer electrodes 20, furthermore, do not need to be substantially L-shaped as in the drawings; they may be so-called "five-side electrodes" or bottom electrodes.

An inductor 1 produced as described above is highly reliable and achieves good voltage resistance, magnetic permeability, saturation flux density, and characteristics under applied DC current. Its core 40 is better than that of known inductors in terms of specific resistance, the percentage of soft magnetic metal, etc., but at the same time has mechanical strength comparable to that of the core of known inductors.

The following describes embodiments and examples of inductors 1.

In each embodiment or example, the inductor 1 has dimensions of about 0.7 mm±about 0.1 mm in height H, about 1.2 mm±about 0.2 mm in width W, and about 2.0 mm±about 0.2 mm in length L and a withstand voltage of about 20 V unless specified otherwise.

The inductor 1 can be constructed using any of the configurations described in each of the following chapters, A. Powder Mix, B. Coil, C. Grinding, and D. Protective Film, and can be made as any combination of such configurations.

A. Powder Mix

The powder mix used to form the core 40 contains soft magnetic powder and resins.

A-1. Soft Magnetic Powder

The soft magnetic powder in the powder mix is a soft magnetic material that is a collection of particles of a soft magnetic metal. The soft magnetic powder includes, for example, first soft magnetic particles 81 (larger particles) and second soft magnetic particles 82 (smaller particles), which have a smaller average diameter than the first soft magnetic particles 81. As mentioned herein, the average diameter of particles refers to the median diameter by volume.

The average diameter of the first soft magnetic particles 81 and that of the second soft magnetic particles 82 can be measured using a particle size analyzer before the particles 81 and 82 are mixed together. If they are measured in the core 40 shaped from the powder mix by pressure molding, the measurement can be performed by analyzing an electron microscope image of a cross-section of soft magnetic particles obtained by polishing the core 40. For example, the equivalent circular diameter of the cross-section of each soft magnetic particle in the electron microscope image is determined, and then the volume of imaginary spheres having this equivalent circular diameter is determined. The median diameter in the distribution of volumes is the average diameter of the particles.

The average diameter of the first soft magnetic particles 81 is about 20 μm or more and about 28 μm or less (i.e., from about 20 μm about 28 μm), preferably about 21.4 μm or more and about 27.4 μm or less (i.e., from about 21.4 μm to about 27.4 μm). The average diameter of the second soft magnetic particles 82 is about 1 μm or more and about 6 μm or less (i.e., from about 1 μm to about 6 μm), preferably about 1.5 μm or more and about 1.8 μm or less (i.e., from about 1.5 μm to about 1.8 μm). Using such a powder mix containing first and second soft magnetic particles 81 and 82 with different average diameters helps improve relative permeability. The first soft magnetic particles 81, having a larger average diameter, increases the saturation flux density, and therefore improves the characteristics under applied DC current, of the finished core 40. The second soft magnetic particles 82, which have a smaller average diameter, penetrate into the gaps between the first soft magnetic particles 81, thereby improving the packing of soft magnetic particles in the core 40.

The amount of the second soft magnetic particles 82 in the powder mix is about 15% by weight or more and about 30% by weight or less (i.e., from about 15% by weight to about 30% by weight), preferably about 20% by weight or more and about 30% by weight or less (i.e., from about 20% by weight to about 30% by weight), of the total weight of soft magnetic particles in the powder mix. When the amount of the second soft magnetic particles 82 in the soft magnetic material is in any of these ranges, the packing of soft magnetic particles in the core 40 shaped from the powder mix is further improved.

The soft magnetic metal composition of the second soft magnetic particles 82 may be the same as that of the first soft magnetic particles 81, but preferably, the two sets of soft magnetic particles have different compositions and substantially equal hardness. The hardness of the first and second soft magnetic particles 81 and 82 can be measured by nanoindentation. The hardness of the first soft magnetic particles 81 is, for example, about 600 HV ($kgf/mm^2$) or more and about 1200 HV or less (i.e., from 600 HV ($kgf/mm^2$) to about 1200 HV), desirably about 800 HV or more and about 1000 HV or less (i.e., from about 800 HV to about 1000 HV). The hardness of the second soft magnetic particles 82 is, for example, about 900 HV ($kgf/mm^2$) or more and about 1400 HV or less (i.e., from about 900 HV ($kgf/mm^2$) to about 1400 HV), desirably about 900 HV or more and about 1100 HV or less (i.e., from about 900 HV to about 1100 HV).

Desirably, the ratio of the hardness of the second soft magnetic particles 82 to that of the first soft magnetic particles 81 is about 0.7 or more and about 1.2 or less (i.e., from about 0.7 to about 1.2). This helps prevent the core 40 from losing its insulation resistance because this prevents the first or second soft magnetic particles 81, or 82, whichever has the lower hardness, from deforming when the powder mix is shaped into the core 40 by pressure molding.

A-2. Resins

The percentage of the resins is about 2.0% by weight or more and about 3.5% by weight or less (i.e., from about 2.0% by weight to about 3.5% by weight) of the total weight of the soft magnetic powder and resins. The resins include at least a bisphenol-A epoxy resin and a rubber-modified epoxy resin, optionally with a phenol-novolac epoxy resin.

The inventors have identified proportions of the bisphenol-A and rubber-modified epoxy resins appropriate for the case when the powder mix contains no phenol-novolac epoxy resin (first resin formula; see the experimental test described later). The first resin formula is about 40% by weight or more and about 90% by weight or less (i.e., from about 40% by weight to about 90% by weight) bisphenol-A epoxy resin and about 10% by weight or more and about 50% by weight or less (i.e., from about 10% by weight to about 50% by weight) rubber-modified epoxy resin, both based on the total weight of resins in the powder mix.

The bisphenol-A epoxy resin is the most abundant resin in the powder mix, but if it is the only resin in the powder mix, the resulting body 10 will often be brittle. Adding a rubber-modified epoxy resin to the powder mix helps reduce the brittleness of the body 10 as it will give the body 10 toughness. Selecting the proportions of the bisphenol-A and rubber-modified epoxy resins to all resins in the powder mix according to the first resin formula and shaping and curing the powder mix into the body 10 with the coil 30 therein in the way as described above, furthermore, will give the inductor 1 strength combined with toughness.

The inventors have also identified proportions of the bisphenol-A, rubber-modified, and phenol-novolac epoxy resins appropriate for the case when the powder mix contains a phenol-novolac epoxy resin (second resin formula; see the experimental test described later). The second resin formula is about 40% by weight or more and about 80% by weight or less (i.e., from about 40% by weight to about 80% by weight) bisphenol-A epoxy resin, about 10% by weight or more and about 50% by weight or less (i.e., from about 10% by weight to about 50% by weight) rubber-modified epoxy resin, and about 1% by weight or more and about 30% by weight or less (i.e., from about 1% by weight to about 30% by weight) phenol-novolac resin, all based on the total weight of resins in the powder mix.

The function of the phenol-novolac epoxy resin is to adjust the flow viscosity of the powder mix when it is shaped and cured into the body and to improve the strength of the body at elevated temperatures by adjusting the glass transition temperature of the body. Mixing in a phenol-novolac epoxy resin according to the second resin formula, therefore, will prevent the body from being damaged when it is heated during shaping as well as giving the inductor 1 strength combined with toughness.

Figure 7:
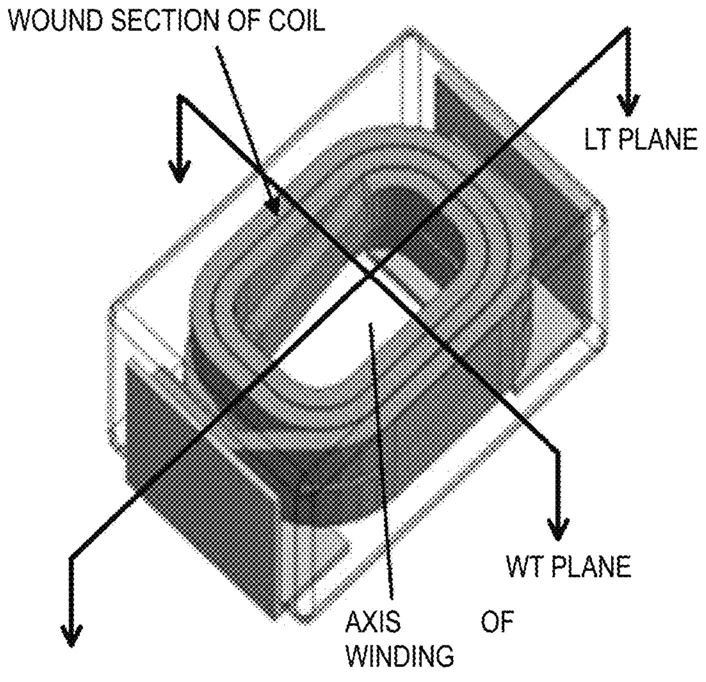
FIG. 7 is a diagram for the description of reference planes of an inductor.
Figure 8:
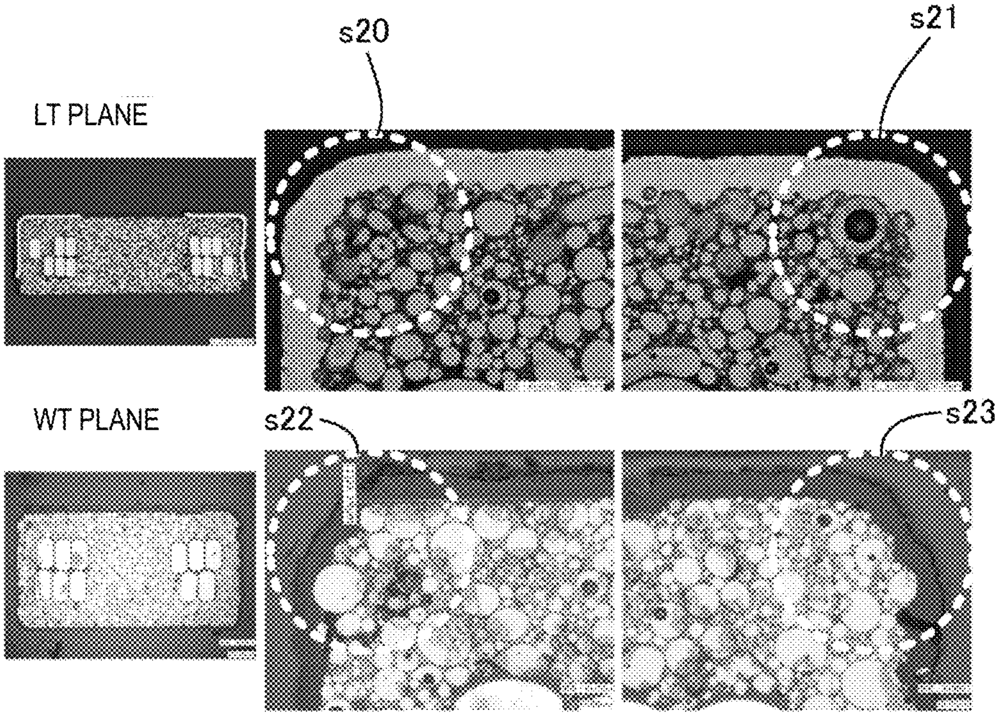
FIG. 8 presents images of resin packing beneath sides of a body.

FIG. 7 is a diagram for the description of the LT and WT planes, which are reference planes of the inductor 1. FIG. 8 presents LT and WT cross-sectional images of an inductor 1 made as illustrated in FIG. 7. As stated, the second sides 18 of the body 10 are ground before the formation of the protective film. The first sides 16, however, are not. Near the ridges s22 and s23 between a primary side (mount surface of the inductor 1 in the image) 12 and the second sides 18, which are seen in the WT cross-sectional image, therefore, the soft magnetic powder is ground to be flush with the second sides. The soft magnetic powder near the ridges s22 and s23 therefore becomes exposed over a large area, making the resin content near the ridges s22 and s23 smaller than that near the ridges s20 and s21 between a primary side 12 and the first sides 16, which are seen in the LT cross-sectional image. As a result, the inductor 1 will have specific configuration 2. Specific configuration 2 helps prevent the inductor from losing its electrical insulation because of soft magnetic particles sticking out of the protective film; by virtue of the grinding, there will be few protruding particles near the ridges between the primary sides 12 and the second sides 18.

Figure 9:
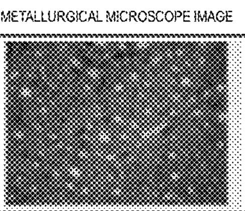
FIG. 9 is a summary of measured surface roughness of a body.
Figure 9:
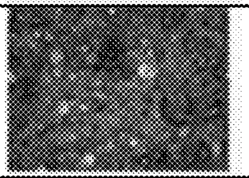
Figure 9:
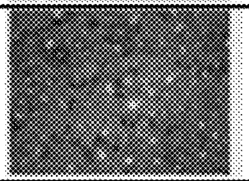
Figure 9:

FIG. 9 is a tabulated representation of electron microscope images of the LT and WT surfaces after the shaping and curing and those after the grinding, along with the maximum heights of the surfaces. Maximum height Sz is a measure of surface roughness. Greater maximum heights Sz indicate greater surface roughness.

In the grinding, the LT surfaces are scraped. Some of the first or second soft magnetic particles there are eliminated at the same time, increasing the roughness of the surfaces. The maximum height Sz of the LT surfaces (50 μm), therefore, becomes larger than that of the WT surfaces (43 μm), which are not ground. Increasing the roughness of the LT surfaces helps improve the adhesion between the protective film and the core on these surfaces. The surface roughness in this context was determined by measuring the maximum height (Sz) longitudinally in the middle of the LT and WT surfaces using a 3D laser scanning microscope (Keyence VK-X250).

Figure 10:
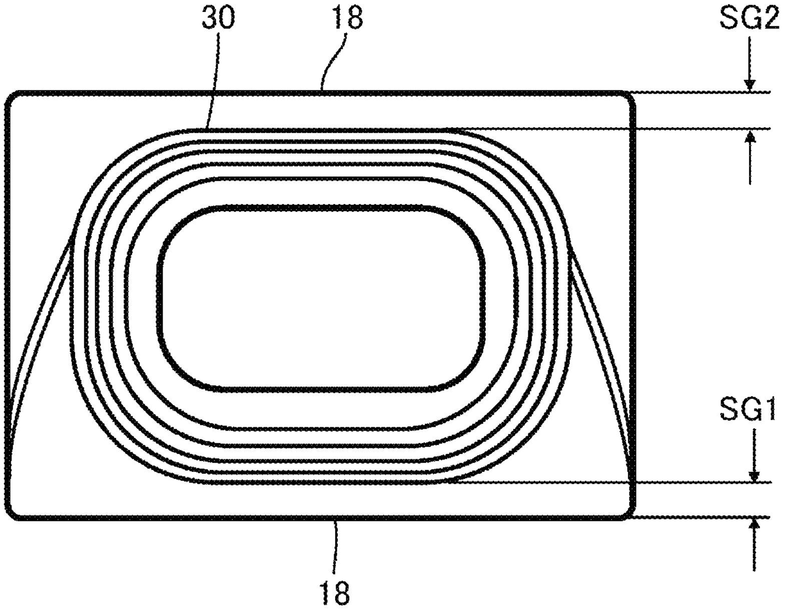
FIG. 10 is a diagram for the description of the distances between sides of a body and a coil.

In addition to this, the narrower of the distances SG1 and SG2 between the second sides 18 and the coil 30, illustrated in FIG. 10, is set greater than about one time and smaller than about four times the diameter of the first soft magnetic particles. As a result, the inductor 1 will have specific configuration 3, whereby the inductor 1 combines sufficient moisture resistance of the body and compactness in outer dimensions.

A-2-1. Embodiment Regarding Side Gaps

To find the relationship between the distances (side gaps) SG1 and SG2 between the second sides 18 and the coil 30, illustrated in FIG. 10, and the moisture resistance of the inductor 1, the samples listed in Tables 1 and 2 were prepared and tested for moisture resistance.

Moisture Resistance

Each sample was subjected to moisture resistance testing in a humidity chamber conditioned to a temperature of 85° C. and a humidity of 85%. The sample was considered passing the test (Pass in the tables) if the weight gain of the body associated with water absorption was 2% by weight or less, and failed (Fail in the tables) if the weight gain exceeded 2% by weight.

Powder Mix Specifications

The percentage of resins in the powder mix was 2.0% by weight or more and 3.5% by weight or less (i.e., from 2.0% by weight to 3.5% by weight), and the first resin formula was used. In the powder mix, the average diameter of the larger soft magnetic particles (first soft magnetic particles) was 21 μm (the samples in Table 1) or 28 μm (the samples in Table 2), and that of the smaller soft magnetic particles (second soft magnetic particles) was 2 μm.

The following describes the testing of samples b51 to b60, the samples listed in Table 1. Samples b54 to b60 are examples of an embodiment of the present disclosure, and samples b51 to b53 are comparative examples.

TABLE 1

| Average diameter of the larger particles, 21 μm; Average diameter of the smaller particles, 2 μm | | | | |
|---|---|---|---|---|
| Sample No. | Narrower side gap (μm) | Wider side gap (μm) | Inductance (μH) | Moisture resistance |
| *b51 | 0 | 110 | 0.412 | Fail |
| *b52 | 10 | 100 | 0.417 | Fail |
| *b53 | 18 | 92 | 0.420 | Fail |
| b54 | 25 | 85 | 0.423 | Pass |
| b55 | 29 | 81 | 0.424 | Pass |
| b56 | 33 | 77 | 0.425 | Pass |
| b57 | 40 | 70 | 0.427 | Pass |
| b58 | 45 | 65 | 0.428 | Pass |
| b59 | 50 | 60 | 0.429 | Pass |
| b60 | 55 | 55 | 0.429 | Pass |

The asterisked samples, b51, b52, and b53, are comparative examples.

Example Set A-2-1-1

Example (Sample b54)

A body was formed with a narrower side gap of 25 μm and a wider side gap of 85 μm. Test result: Passed the moisture resistance test.

Example (Sample b55)

A body was formed with a narrower side gap of 29 μm and a wider side gap of 81 μm. Test result: Passed the moisture resistance test.

Example (Sample b56)

A body was formed with a narrower side gap of 33 μm and a wider side gap of 77 μm. Test result: Passed the moisture resistance test.

Example (Sample b57)

A body was formed with a narrower side gap of 40 μm and a wider side gap of 70 μm. Test result: Passed the moisture resistance test.

Example (Sample b58)

A body was formed with a narrower side gap of 45 μm and a wider side gap of 65 μm. Test result: Passed the moisture resistance test.

Example (Sample b59)

A body was formed with a narrower side gap of 50 μm and a wider side gap of 60 μm. Test result: Passed the moisture resistance test.

Example (Sample b60)

A body was formed with equal side gaps of 55 μm. Test result: Passed the moisture resistance test.

Comparative Example Set A-2-1-1

Comparative Example (Sample b51)

A body was formed with a narrower side gap of 0 μm and a wider side gap of 110 μm. Test result: Failed the moisture resistance test.

Comparative Example (Sample b52)

A body was formed with a narrower side gap of 10 μm and a wider side gap of 100 μm. Test result: Failed the moisture resistance test.

Comparative Example (Sample b53)

A body was formed with a narrower side gap of 18 μm and a wider side gap of 92 μm. Test result: Failed the moisture resistance test.

Based on the test results in Table 1, with first soft magnetic particles having an average diameter of about 21 μm, the body is resistant to moisture when its smaller side gap is greater than about one time and smaller than about four times the diameter of the first soft magnetic particles.

The following describes the testing of samples b61 to b70, the samples listed in Table 2. Samples b65 to b70 are examples of an embodiment of the present disclosure, and samples b61 to b64 are comparative examples.

TABLE 2

| Average diameter of the larger particles, 28 μm; Average diameter of the smaller particles, 2 μm | | | | |
|---|---|---|---|---|
| Sample No. | Narrower side gap (μm) | Wider side gap (μm) | Inductance (μH) | Moisture resistance |
| *b61 | 0 | 110 | 0.424 | Fail |
| *b62 | 10 | 100 | 0.430 | Fail |
| *b63 | 18 | 92 | 0.433 | Fail |
| *b64 | 25 | 85 | 0.436 | Fail |
| b65 | 29 | 81 | 0.437 | Pass |
| b66 | 33 | 77 | 0.439 | Pass |
| b67 | 40 | 70 | 0.440 | Pass |
| b68 | 45 | 65 | 0.441 | Pass |
| b69 | 50 | 60 | 0.442 | Pass |
| b70 | 55 | 55 | 0.442 | Pass |

The asterisked samples, b61, b62, b63, and b64, are comparative examples.

Example Set A-2-1-2

Example (Sample b65)

A body was formed with a narrower side gap of 29 μm and a wider side gap of 81 μm. Test result: Passed the moisture resistance test.

Example (Sample b66)

A body was formed with a narrower side gap of 33 μm and a wider side gap of 77 μm. Test result: Passed the moisture resistance test.

Example (Sample b67)

A body was formed with a narrower side gap of 40 μm and a wider side gap of 70 μm. Test result: Passed the moisture resistance test.

Example (Sample b68)

A body was formed with a narrower side gap of 45 μm and a wider side gap of 65 μm. Test result: Passed the moisture resistance test.

Example (Sample b69)

A body was formed with a narrower side gap of 50 μm and a wider side gap of 60 μm. Test result: Passed the moisture resistance test.

Example (Sample b70)

A body was formed with equal side gaps of 55 μm. Test result: Passed the moisture resistance test.

Comparative Example Set A-2-1-2

Comparative Example (Sample b61)

A body was formed with a narrower side gap of 0 μm and a wider side gap of 110 μm. Test result: Failed the moisture resistance test.

Comparative Example (Sample b62)

A body was formed with a narrower side gap of 10 μm and a wider side gap of 100 μm. Test result: Failed the moisture resistance test.

Comparative Example (Sample b63)

A body was formed with a narrower side gap of 18 μm and a wider side gap of 92 μm. Test result: Failed the moisture resistance test.

Comparative Example (Sample b64)

A body was formed with a narrower side gap of 25 μm and a wider side gap of 85 μm. Test result: Failed the moisture resistance test.

Based on the test results in Table 2, with first soft magnetic particles having an average diameter of about 28 μm, the body is resistant to moisture when its smaller side gap is greater than about one time and smaller than about four times the diameter of the first soft magnetic particles.

A-2-2. Other Considerations

In the above embodiments, the resins contained in the powder mix are a bisphenol-A epoxy resin, a rubber-modified epoxy resin, and a phenol-novolac epoxy resin. The superordinate category of bisphenol-A epoxy resins is epoxy resins, and that of rubber-modified epoxy resins is flexible rubbers or resins.

Examples of resins that may potentially be used as an alternative to the bisphenol-A epoxy resin include bisphenol-A, -F, and -S phenoxy resins. Examples of resins or rubbers that may potentially be used as an alternative to the rubber-modified epoxy resin include urethane-modified, NBR (acrylonitrile butadiene rubber)-modified, and CTBN (carboxyl-terminated butadiene acrylonitrile) rubber-modified epoxy resins and CTBN rubber. Examples of resins that may potentially be used as an alternative to the phenol-novolac epoxy resin include cresol, dicyclopentadiene, phenol aralkyl, biphenyl, naphthol, xylylene, triphenylmethane, and tetrakisphenolethane epoxy resins if only novolac resins are considered. As for non-novolac resins, naphthalene, biphenyl, and triazine epoxy resins can be used.

B. Coil

Wire

The wire that forms the coil 30 of the inductor 1 may be substantially round or may be substantially rectangular (in FIG. 3, it is substantially rectangular). Substantially rectangular wire is easier to wind without space between portions thereof when forming the wound section 32.

The number of turns in the wound section 32 is selected according to the characteristics the inductor 1 should have.

Preferably, the wire is copper wire.

Preferably, in the inductor 1, the wound section 32 of the coil 30 measures about 1.17 mm in outer diameter and about 0.55 mm in inner diameter, both in the direction of width W, and about 0.4 mm in height.

If the height H of the inductor 1 is changed to about 0.55 mm±about 0.1 mm, it is preferred that the wound section 32 measure about 1.17 mm±about 0.05 mm in outer diameter, about 0.48 mm±about 0.05 mm in inner diameter, and about 0.30 mm±about 0.05 mm in height.

If the coil 30 is formed by substantially rectangular wire, it is preferred that its thickness be about 0.118 mm or less, more preferably about 0.113 mm or less. Thin wire is advantageous in reducing the overall size of the coil component because a coil 30 made from thin wire is smaller than one made from thick wire if the number of turns is the same. If the size is the same, a coil 30 made from thin wire has more turns than one made from thick wire.

Preferably, the thickness of the substantially rectangular wire is about 0.052 mm or more. The thickness can even be about 0.077 mm or more, and this is more preferred. The electrical resistance of the substantially rectangular wire is low enough when its thickness is about 0.052 mm or more.

Preferably, the width of the substantially rectangular wire is about 0.203 mm or less. The width can even be about 0.183 mm or less, and this is more preferred.

Narrow wire is advantageous in reducing the overall size of the coil component as narrower wire gives a smaller coil 30.

Preferably, the width of the substantially rectangular wire is about 0.141 mm or more. The width can even be about 0.162 mm or more, and this is more preferred. The electrical resistance of the substantially rectangular wire is low enough when its width is about 0.141 mm or more.

The aspect ratio (width/thickness) of the substantially rectangular wire can be between about 1:1.3 and about 1:3.4. The aspect ratio can be about 1:1.3, and this is preferred.

If the width W of the inductor 1 is changed to about 0.55 mm±about 0.1 mm, the coil 30 is made from a wire having a thickness of about 0.113 mm, a width of about 0.141 mm, and an aspect ratio (width/thickness) of about 1:1.3.

The aspect ratio of the wire can be smaller than usual. As the aspect ratio of the wire becomes smaller, the inductor 1 achieves higher saturation flux density Bs and has lower Rdc (DC resistance) because its occupancy by the coil 30 (wire) in the direction of width W improves relative to that in the direction of height H.

Insulation Coating

The material for the coating layer of the insulation coating 60 is not critical. Examples include polyurethane, polyester, epoxy, and polyimide-amide resins. Preferably, the coating layer is made of polyimide-amide resin.

Preferably, the thickness of the coating layer is about 4 μm.

As for the fuser coating layer of the insulation coating 60, an example of a material is polyamide resin.

Preferably, the thickness of the fuser coating layer is about 1 μm or more and about 25 μm or less (i.e., from about 1 μm to about 25 μm), more preferably about 2 μm or more and about 25 μm or less (i.e., from about 2 μm to about 25 μm), even more preferably about 2 μm or more and about 4 μm or less (i.e., from about 2 μm to about 4 μm).

Setting the thickness of the fuser coating layer as such helps prevent shape defects in the coil 30. In that case the wound section 32 of the coil 30 will not be too large, but the bonding will be strong enough to prevent the outermost loops of the wound section 32 from disintegrating by springing back.

C. Grinding

In the embodiments and examples described herein, the body 10 of the inductor 1 is an article shaped from a mixture of soft magnetic powder and resins, or powder mix, by compression molding. The soft magnetic powder contains larger particles, which have a large average diameter, and smaller particles, which have an average diameter smaller than that of the larger particles.

As stated with reference to FIG. 4, the body 10 shaped by compression molding is subjected to the grinding of its second sides 18 (FIG. 1) with an abrasive to a predetermined width W. This will trim the body 10 to a predetermined size, increasing the occupancy of the body 10 by the coil 30. This approach of trimming the body 10 to a predetermined size by grinding is advantageous over controlling the size of the body 10 by adjusting the dimensions of the cavity in the mold in terms of size variations between bodies 10. Barrel polishing, for example, may follow to round the corners of the second sides 18 produced by the grinding.

Grinder

Figure 11:
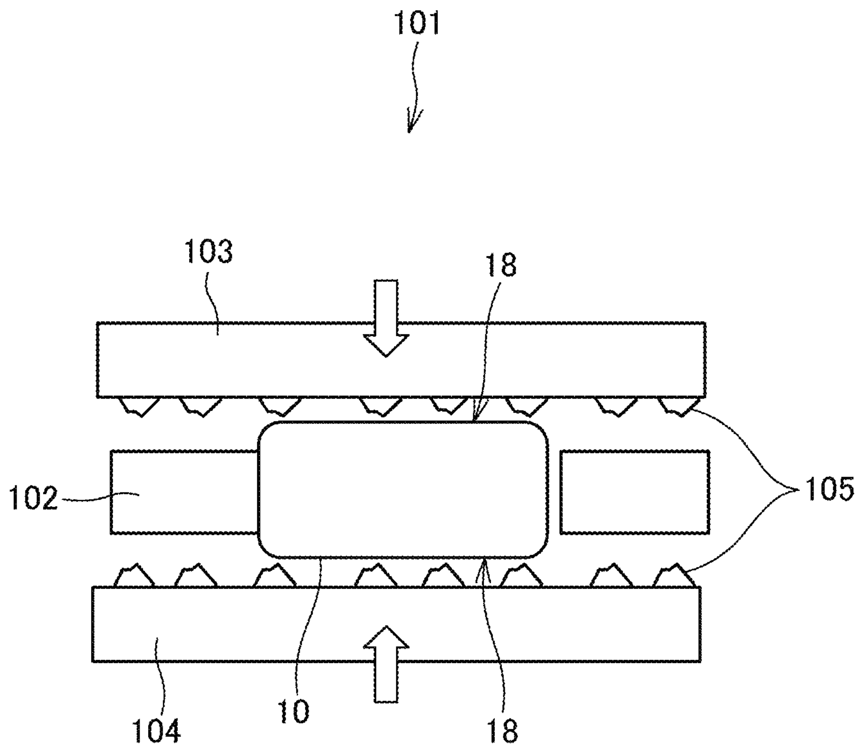
FIG. 11 is a diagram schematically illustrating an example of a grinder used in the grinding of a body.

FIG. 11 is a diagram schematically illustrating an example of a grinder 101 used in the grinding.

The grinder 101 includes a holder 102 for holding the body 10 to be ground (workpiece) in and upper and lower grindstones 103 and 104 for sandwiching the body 10 held in the holder 102 between. The body 10 is held in the holder 102 with its second sides 18, or the surfaces to be ground, up and down.

During the grinding, the grinder 101 presses its upper and lower grindstones 103 and 104 against the upper and lower second sides 18, respectively, with a predetermined load and moves the upper and lower grindstones 103 and 104 relative to the upper and lower second sides 18 at the same time. An abrasive 105 on the upper and lower grindstones 103 and 104 grinds the upper and lower second sides 18 simultaneously (double-side grinding).

Grit Size

The inventors have experimentally confirmed that the size of the abrasive 105 is proportional to the rate of grinding. As the abrasive 105 becomes larger, furthermore, the grinding eliminates more particles of the soft magnetic powder from the surfaces, and the ground surfaces will have greater roughness.

To be more exact, grinding an article shaped from soft magnetic powder will cause a considerable number of particles of the powder to be eliminated by the abrasive 105, which will leave hollows in the ground surfaces. If the soft magnetic powder contains larger and smaller particles, the grinding eliminates more of the larger particles than the smaller ones. As the size of the abrasive 105 increases, the grinding eliminates a greater number of larger particles, creating a greater number of relatively large hollows in the ground surfaces. As a result, the ground surfaces will have greater roughness.

As for surface roughness, the inventors have experimentally confirmed that there is no correlation between surface roughness and load.

In the examples described herein, surface roughness evaluations were based on arithmetic mean height. Specifically, multiple (e.g., three to four) measurement areas of a predetermined size (about 200 μm×about 290 μm) were defined on the surface of interest, the maximum height in each area was measured using a laser microscope, and the average was reported as the arithmetic mean height. The laser microscope was Keyence Corporation's VK-X250.

Grinding Speed

The inventors have experimentally confirmed that as the grinding speed (velocity of the movement of the upper and lower grindstones 103 and 104) increases, the grinding smoothens the exposed particles of the soft magnetic powder more effectively, and the ground surfaces will have smaller roughness. The grinding speed, furthermore, is proportional to the rate of grinding.

Rate of Grinding

A target rate of grinding is set, and the size of the abrasive 105 and the grinding speed are selected to achieve this target. As stated, the size of the abrasive 105 and the grinding speed are each related to the roughness of the ground surfaces. In the examples described herein, the size of the abrasive 105 and the grinding speed were selected to ensure that the grinding would increase the roughness of the second sides 18 and make these sides rougher than the top 14 and the mount surface 12, which were not to be ground.

The increased surface roughness Sa brought by the grinding will strengthen the adhesion of the protective film 50 on the second sides 18 of the body 10. The body 10, except where it has the outer electrodes 20 on, is covered with a protective film 50 that protects the body 10 from moisture and corrosion and provides good electrical insulation.

Duration of Grinding

The duration of grinding is defined as the length of time from the start of grinding Ts to the end of grinding Te and is determined based on the difference between the initial and target widths W of the body 10 and the rate of grinding.

During the grinding, a controller (not illustrated) controls the operation of the grinder 101 based on a load profile and the determined duration of grinding, ensuring that the body 10 shaped by compression molding will be ground to a predetermined width W.

Side Gaps

Figure 12:
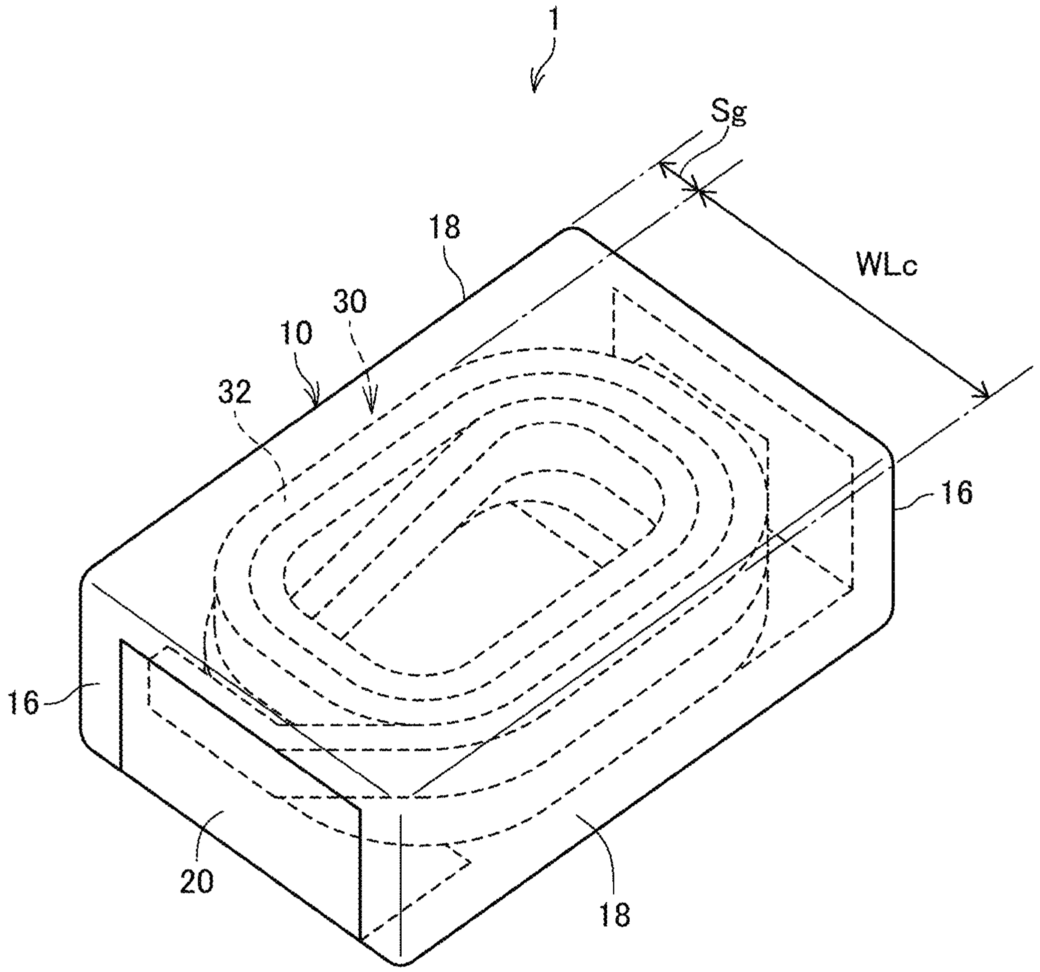
FIG. 12 is a diagram for the description of side gaps.

As illustrated in FIG. 12, a side gap Sg of the inductor 1 is defined as the thickness of the body 10 between the coil 30 therein and the closer second side 18. If the body 10 is covered with a protective film 50, the side gap Sg excludes the thickness of the protective film 50.

In the examples described herein, the side gaps Sg of the body 10 ground to a predetermined width W were wider than the equivalent of one larger particle of the soft magnetic powder and narrower than the equivalent of four larger particles of the soft magnetic powder. In other words, in the examples described herein, the target width of the body 10 in the grinding and/or the width WLc of the wound section 32 of the coil 30 (FIG. 12) were adjusted beforehand to ensure that the side gaps Sg of the body 10 ground to a predetermined width W would be such.

Setting the side gaps Sg of the ground body 10 wider than the equivalent of about one larger particle of the soft magnetic powder will prevent the coil 30 from being exposed. Even if the grinding eliminates particles from the second sides 18, at least one large particle will remain between the second sides 18 and the coil 30.

Limiting the side gaps Sg of the ground body 10 to narrower than the equivalent of about four larger particles of the soft magnetic powder will prevent loss of inductance. With such side gaps Sg, the body 10 is not too large, and, therefore, its occupancy by the coil 30 remains sufficiently high.

Tables 3 and 4 present measured inductance and moisture resistance of inductors 1 with different combinations of the maximum and minimum side gaps Sg.

The data in Table 3 are from inductors 1 made with a soft magnetic powder in which the average diameters of the larger and smaller particles were 21 μm and 2 μm, respectively. The data in Table 4 are from inductors 1 made with a soft magnetic powder in which the average diameters of the larger and smaller particles were 28 μm and 2 μm, respectively.

The inductance was measured using an LCR meter, and the moisture resistance was examined by exposing the inductors 1 to an environment at a temperature of 85° C. and a humidity of 85%. For moisture resistance, "Fail" means the inductor 1 failed to meet predetermined quality criteria.

TABLE 3

| Side gaps | | Inductance | Moisture |
|---|---|---|---|
| Minimum | Maximum | (μH) | resistance |
| 0 | 110 | 0.412 | Fail |
| 10 | 100 | 0.417 | Fail |
| 18 | 92 | 0.420 | Fail |
| 25 | 85 | 0.423 | Pass |
| 29 | 81 | 0.424 | Pass |
| 33 | 77 | 0.425 | Pass |
| 40 | 70 | 0.427 | Pass |
| 45 | 65 | 0.428 | Pass |
| 50 | 60 | 0.429 | Pass |
| 55 | 55 | 0.429 | Pass |

TABLE 4

| Side gaps | | Inductance | Moisture |
|---|---|---|---|
| Minimum | Maximum | (μH) | resistance |
| 0 | 110 | 0.424 | Fail |
| 10 | 100 | 0.430 | Fail |
| 18 | 92 | 0.433 | Fail |
| 25 | 85 | 0.436 | Fail |
| 29 | 81 | 0.437 | Pass |
| 33 | 77 | 0.439 | Pass |
| 40 | 70 | 0.440 | Pass |
| 45 | 65 | 0.441 | Pass |
| 50 | 60 | 0.442 | Pass |
| 55 | 55 | 0.442 | Pass |

As shown in Tables 3 and 4, the body 10 is sufficiently resistant to moisture when its minimum side gap Sg is wider than the equivalent of about one larger particle. The inductance, furthermore, decreases with increasing maximum side gap Sg.

The data also indicate that the inductor 1 performs well in both moisture resistance and inductance when both side gaps Sg are roughly equal (about 1:1) and wider than the equivalent of about one larger particle and narrower than the equivalent of about four larger particles.

Overall, an inductor 1 according to an embodiment of the present disclosure is composed of a substantially plate-shaped body 10 with an embedded coil 30 therein and a pair of outer electrodes 20 on the body 10. The body 10 has been shaped from powder mix of soft magnetic powder containing two sets of particles with different average diameters, namely larger and smaller particles, and resins. The body 10 has second sides 18 in the radial direction with respect to the coil 30, and the side gaps Sg of the body 10, which are the thickness dimensions between the second sides 18 and the coil 30, are wider than the equivalent of about one larger particle and narrower than the equivalent of about four larger particles.

By virtue of the side gaps Sg of the body 10 set wider than the equivalent of about one larger particle of the soft magnetic powder, the coil 30 is prevented from being exposed because there is at least one large particle between the second sides 18 and the coil 30.

By virtue of the side gaps Sg of the body 10 limited to narrower than the equivalent of about four larger particles of the soft magnetic powder, loss of inductance is prevented because with such side gaps Sg, the body 10 is not too large, and, therefore, its occupancy by the coil 30 remains sufficiently high. Although small in size, the resulting inductor 1 is practical in terms of DC resistance and saturation flux density.

In this embodiment, the second sides 18 of the body 10 of the inductor 1 are covered with a protective film 50 and are rougher than at least one of the other sides (the mount surface 12 and the top 14).

By virtue of this, the second sides 18 and the protective film 50 adhere firmly to each other.

In this embodiment, the surface of the body 10 of the inductor 1 is covered with a protective film 50 except where it has the outer electrodes 20 on.

The protective film 50 protects the body 10 from moisture and corrosion and provides good electrical insulation, making the inductor 1 a quality one.

D. Protective Film

In the embodiments and examples described herein, the body 10 of the inductor 1 is an article shaped from a mixture of soft magnetic powder and resins, or powder mix, by compression molding. The soft magnetic powder contains larger particles, which have a large average diameter, and smaller particles, which have an average diameter smaller than that of the larger particles.

The protective film 50 covers the entire surface of the body 10 excluding where it has the outer electrodes 20 on. The protective film 50 provides electrical insulation and protects the body 10 from moisture and corrosion. Even if the grinding eliminates larger particles of the soft magnetic powder from the ground surfaces (second sides 18), covering the ground surfaces with the protective film 50 will compensate for the associated loss of electrical insulation and resistance to moisture and corrosion.

Formation of the Protective Film and the Device for it

As described with reference to FIG. 4, the protective film 50 is formed by applying a material containing a thermosetting resin to the entire surface of the body 10, for example by spraying or dipping.

Figure 13:
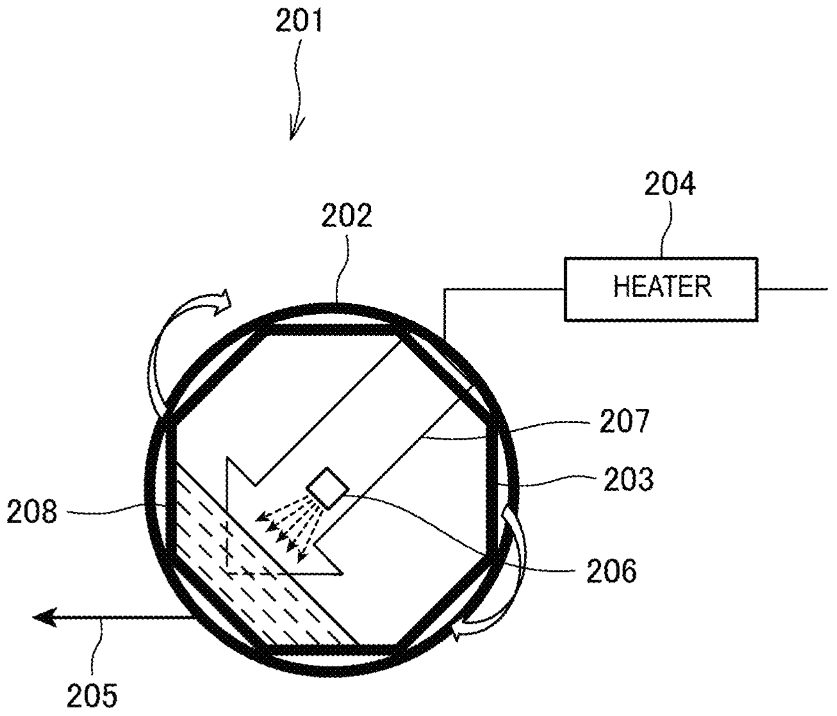
FIG. 13 is a diagram schematically illustrating an example of a film forming device used in the formation of a protective film.

FIG. 13 is a diagram schematically illustrating an example of a film forming device 201 used in the film formation (Step 500 in FIG. 4).

The film forming device 201 forms the protective film 50 on the surface of many bodies 10 provided as workpieces 208 by spraying the material thereonto. As illustrated in the drawing, the film forming device 201 includes an enclosure

202, a rotary drum 203 therein for putting the bodies 10 (workpieces 208) in, a heater 204 for heating the drum 203, a duct 205 as an exhaust for the drum 203, and a spray nozzle 206 inside the drum 203.

To carry out the film formation, the film forming device 201 first preheats the drum 203 with the bodies 10 therein. Using the heater 204, the drum 203 is heated to a temperature at which no curing occurs (e.g., about 30° C. to about 70° C.).

Then the film forming device 201 forms the protective film 50 on the surface of the bodies 10 by spraying the material for the protective film 50 onto the bodies 10 through the spray nozzle 206 and at the same time blowing hot air 207 onto the bodies 10 through an air nozzle (not illustrated) while rolling (barreling) the drum 203 to tumble the bodies 10. At the last stage, the film forming device 201 stops spraying the material for the protective film 50 but continues the tumbling of the bodies 10 and the blowing of hot air 207 onto the bodies 10 until the protective film 50 on the bodies 10 dries to an appropriate degree. After the drying of the protective film 50, the bodies 10 are removed from the drum 203.

Insufficient drying will cause the protective film 50 to have pores (small holes) and/or swellings and will also affect the adhesion of the protective film 50 to the bodies 10. Excessive drying will make the protective film 50 a "discontinuous" film and will also affect the adhesion of the protective film 50 to the bodies 10. Preferably, the protective film 50 is dried to such a degree that it will be a "continuous" film and adhere to the bodies 10 well.

Material for the Protective Film

The material for the protective film 50 is a liquid mixture of a resin component as the base, a solvent component as a diluent for the resin component, and a filler component as an additive.

Resin Component

An example of a suitable resin component is an epoxy resin as the primary ingredient with added phenoxy and/or novolac resins. Adding a phenoxy resin will toughen the protective film 50. Adding a novolac resin will make the protective film 50 more resistant to heat.

Preferably, a resin in the resin component contains a pigment.

During the film removal (Step 600) and electrode formation (Step 700), described with reference to FIG. 4, a pigmented resin improves the workability of the bodies 10 when their surface is irradiated with a laser for the removal of the protective film 50 and when the outer electrodes 20 are formed. An example of a suitable pigment is carbon black.

Solvent Component

The solvent component includes solvent(s) that can be sprayed in mist form together with the resin component and then dries to an appropriate degree. An example of a suitable solvent component is one that contains methyl ethyl ketone (MEK), which is used as a diluent for resin paste.

Filler Component

The filler component includes filler(s) that reduces the gloss of the protective film 50, improves the quality of the protective film 50, and disperses in the solvent(s).

Reducing the gloss of the protective film 50 helps prevent errors caused by washed-out color when the inductors 1 are visually inspected with a camera. An example of a suitable filler is powdered silica ($SiO_2$).

As for the particle size, the smaller, the better. Small filler particles help prevent the spray nozzle 206, through which the material for the protective film 50 is sprayed, from clogging and reduce the damage to the surface of the bodies 10 from the barreling of the drum 203. If the filler is powdered silica, it is preferred to use nanosilica.

Nanosilica

The inventors have experimentally found that when the filler is nanosilica, there is a correlation between the rate of drying and the nanosilica content.

Figure 14:
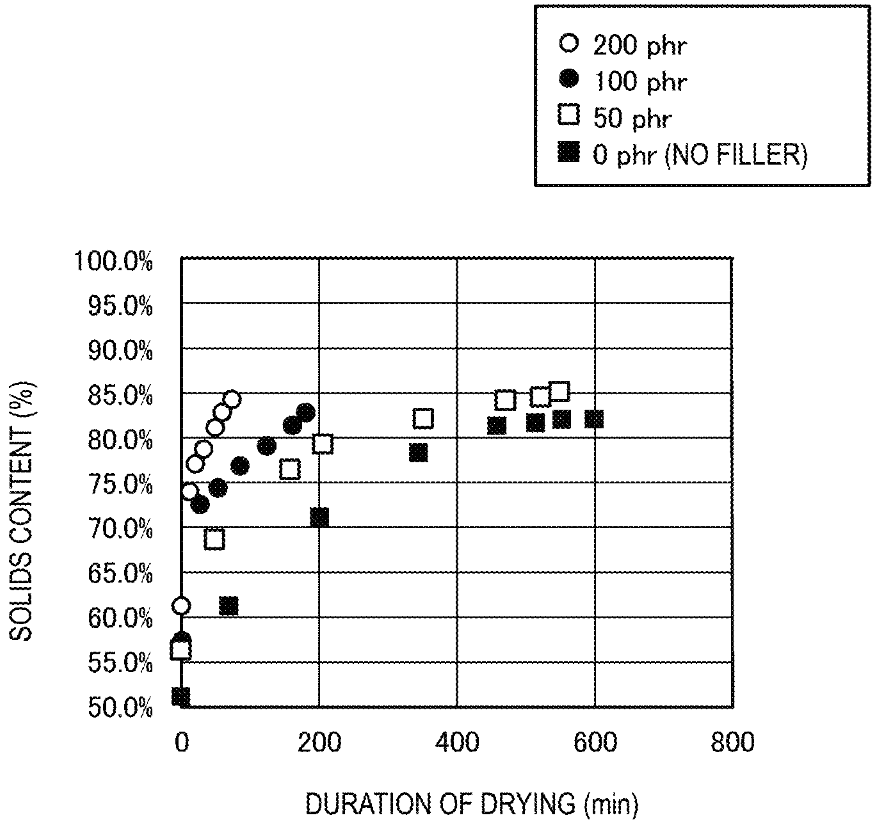
FIG. 14 is a graphical representation of experimentally determined relationships between nanosilica content and the rate of drying.

FIG. 14 is a graphical representation of relationships between the nanosilica content and the rate of drying determined through an experiment.

In this experiment, sample materials for the protective film 50 were prepared with an epoxy resin as the resin component, MEK as the solvent component, and nanosilica as the filler component. Inductors 1 were constructed by forming a protective film 50 on bodies 10 using these samples and forming outer electrodes 20 on the bodies 10. During the drying of the protective film 50, the relationship between the duration of drying, i.e., the length of time for which the bodies 10 were left, and the solids content of the protective film 50 was investigated.

Four sample materials for the protective film 50 were prepared with different amounts of nanosilica: 0 (containing no nanosilica), 50 phr, 100 phr, and 200 phr. In all samples, the average diameter of particles of the nanosilica was 45 nm.

The average diameter of the silica particles was measured as follows. The body 10 was cut in parallel with its second sides 18 at the intersection of the diagonals of the top 14 of the inductor 1. On the upper and lower primary sides of the body 10, the cross-section of the protective film 50 was imaged with a transmission electron microscope (TEM) at each quarter of the length L of the body 10 at a magnification of ×300,000. The average diameter was determined by observing silica particles in the TEM images. The TEM was a field-emission transmission electron microscope (FE-TEM), more specifically JEOL Ltd.'s multipurpose electron microscope (JEM-F200) combined with an energy-dispersive x-ray microanalysis (EDX) system (Thermo Fischer Scientific Inc. NORAN System 7).

As can be seen from FIG. 14, the solids content increases with increasing nanosilica content, and even short drying results in a high solids content when the nanosilica content is high. Increasing the nanosilica content of the material for the protective film 50, therefore, will accelerate the drying, and therefore helps shorten the duration of drying, of the protective film 50.

In addition, observations in this experiment revealed that the "sticking," described below, of the protective film 50 occurs when the solids content upon drying is about 80% or less. When the solids content upon drying is about 90%, the protective film 50 is of good quality but has cracks in its surface.

It is therefore preferred that the protective film 50 be dried to a solids content of about 80% to about 90%.

Film Sticking

When the bodies are sprayed in the drum 203, the protective film 50 may stick between bodies 10. This can affect the quality of the protective film 50 and herein is referred to as "film sticking." The inventors have experimentally found that when the filler is nanosilica, the film sticking can be reduced by changing the diameter of particles of the nanosilica.

Figure 15:
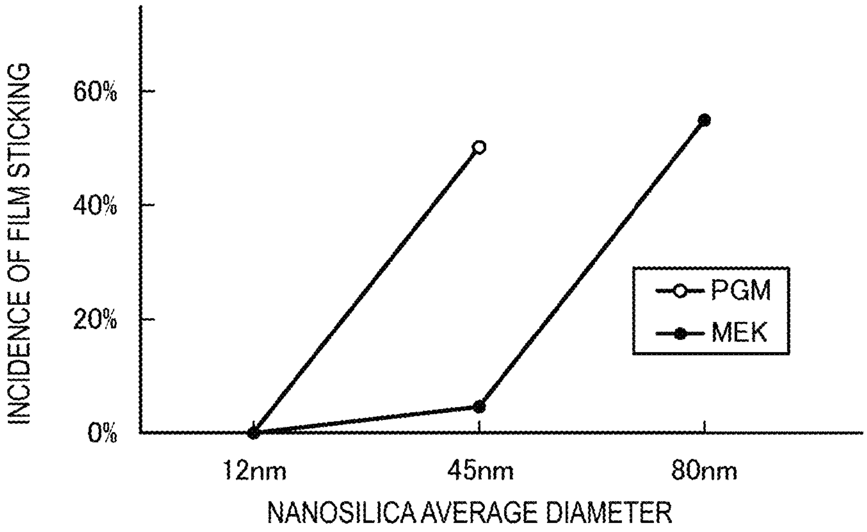
FIG. 15 is a graphical representation of experimentally determined relationships between the average diameter of nanosilica particles and the incidence of "film sticking"

FIG. 15 is a graphical representation of relationships between the average diameter of particles of nanosilica and the incidence of film sticking determined through an experiment.

In this experiment, two sample materials for the protective film 50, samples 1 and 2, were prepared.

Sample 1 was made with an epoxy resin as the resin component, PGM as the solvent component, and nanosilica as the filler component. Sample 2 was made with an epoxy resin as the resin component, MEK as the solvent component, and nanosilica as the filler component. The nanosilica content of both samples 1 and 2 was 200 phr.

A protective film 50 was formed on bodies 10 using samples 1 and 2 as described above, and then the bodies 10 were removed from the drum 203. The incidence of film sticking was determined from the number of sticking bodies 10.

As can be seen from FIG. 15, the incidence of film sticking decreases with decreasing average diameter of the silica particles.

When sample 1, made with PGM as the solvent component, and sample 2, made with MEK as the solvent component, were compared, the incidence of film sticking was lower with sample 2 for a given average diameter of silica particles.

For sample 2, furthermore, the incidence of film sticking was markedly low when the average diameter of the silica particles was 45 nm or less.

For both samples 1 and 2, the incidence of film sticking was reduced to near zero as the average diameter of the silica particles decreased to about 12 nm.

Figure 16:
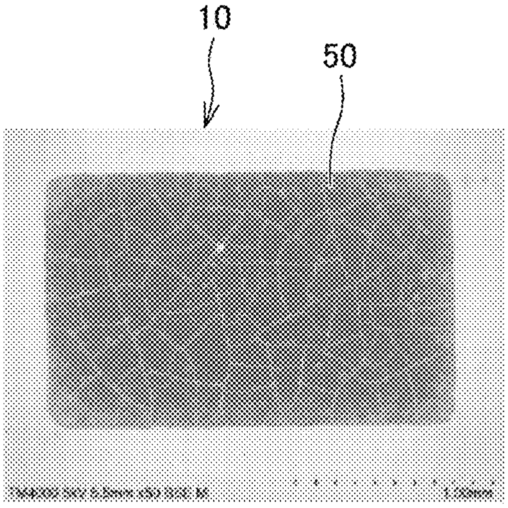
FIG. 16 is an image of cracks in a protective film.

When the average diameter of the silica particles was 12 nm, however, the protective film 50 cracked as in FIG. 16 with both samples 1 and 2. It is, therefore, preferred that the average diameter of the silica particles be more than about 12 nm, more preferably about 15 nm or more as this makes it more certain that the protective film 50 will not crack.

In the experiment, furthermore, the filler settled down in the material for the protective film 50 when the average diameter of silica particles exceeded 75 nm. A protective film 50 formed from this material would be nonuniform, even though it might not stick. It is, therefore, preferred that the average diameter of the silica particles be about 75 nm or less, with which the silica particles do not settle down in the material for the protective film 50.

In addition, if the material for the protective film 50 contains silica particles (powdered silica) with an average diameter of about 15 nm to about 75 nm and if the amount of the silica particles is such that the material dries sufficiently fast (between about 150 phr and about 250 phr), the percentage by weight of silica particles to resin in the resulting protective film 50 is between about 150% and about 250%.

In other words, a protective film 50 formed with such a silica-to-resin weight percentage dries quickly and does not stick; the protective film 50 in this case is of high quality.

Plating Marks

Figure 17:
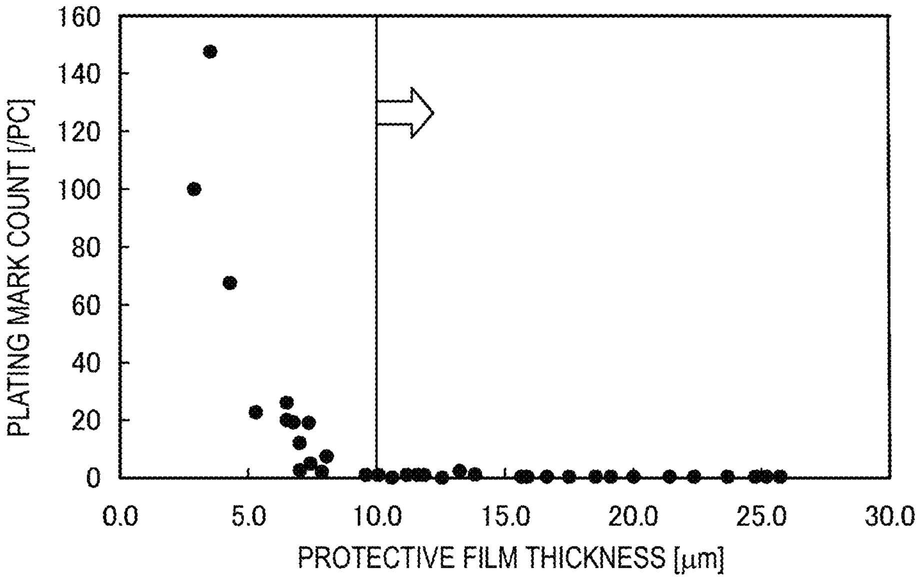
FIG. 17 is a graphical representation of a "plating mark" count with varying thickness of a protective film.

FIG. 17 is a graphical representation of the number of plating marks with varying thickness of the protective film 50.

The protective film 50 can leave areas of the body 10 exposed, and these areas may be unwantedly plated during the electrode formation. Deposits of this unwanted plating are herein referred to as "plating marks." An example of a cause of plating marks is the elimination of larger particles of the soft magnetic powder associated with grinding. The material for the protective film 50 can fail to fill the relatively large hollows left in the surface of the body 10, and in the unfilled hollows plating marks can occur.

In this measurement, the body 10 was examined for plating marks at predetermined intervals along the full length of the ridges between the top 14 and mount surface 12 and the first and second sides 16 and 18, and the plating marks were counted.

As can be seen from the graph, many plating marks were observed when the protective film 50 was thin. When the thickness of the protective film 50 was 5 μm or more, however, the number of plating marks decreased markedly. When the thickness of the protective film 50 was 10 μm or more, no plating marks were observed.

It is, therefore, preferred that the thickness of the protective film 50 be about 10 μm or more. With such a thickness, the protective film 50 certainly protects the entire surface of the body 10 and prevents plating marks.

If the size of the body 10 of the inductor 1 has been specified, however, thickening of the protective film 50 will affect the performance of the inductor 1 because it means reducing the size of the body 10 excluding the protective film 50 and therefore the size of the coil 30 accordingly.

The protective film 50, furthermore, is then removed, and outer electrodes 20 are formed in the areas of the inductor 1 from which the protective film 50 has been removed. If the protective film 50 is thicker than the outer electrodes 20, therefore, the contact between the outer electrodes 20 and the circuit board will be poor because the surface of the outer electrodes 20 is lower than that of the protective film 50.

It is, therefore, preferred that the thickness of the protective film 50 be smaller than, or at least roughly equal to, that of the outer electrodes 20. In the embodiments and examples described herein, the thickness of the outer electrodes 20 is between about 0.58 mm and about 0.75 mm for inductors 1 measuring about 0.7 mm±about 0.1 mm in height H, about 1.2 mm±about 0.2 mm in width W, and about 2.0 mm±about 0.2 mm in length L. For inductors 1 measuring about 0.55 mm±about 0.1 mm in height H, about 1.2 mm±about 0.2 mm in width W, and about 2.0 mm±about 0.2 mm in length L, the thickness of the outer electrodes 20 is between about 0.58 mm and about 0.75 mm and is in a range of about 0.43 mm to about 0.60 mm More preferably, to give the inductor 1 high performance, the thickness of the protective film 50 is about 30 μm or less besides being smaller than or roughly equal to that of the outer electrodes 20.

The thickness of the outer electrodes 20 was measured as follows. That is, the body 10 was cut in parallel with its second sides 18 at the intersection of the diagonals of the top 14 of the inductor 1. The thickness of the outer electrodes 20 on the mount surface 12 of the body 10 was measured at each quarter of the length L of the electrodes 20 using a microscope at a magnification of ×1000 and averaged (first measurement). The average first measurement of ten inductors 1 was reported as the thickness of the outer electrodes 20. The microscope was Keyence Corporation's VHX-7000.

Countermeasures against the Elimination of Particles

As stated, since the body 10 is an article shaped from soft magnetic powder, grinding its surface involves eliminating a considerable number of particles of the powder. In the embodiments and examples described herein, the soft magnetic powder contains larger particles, which have a larger average diameter, and smaller particles, which have a smaller average diameter. The grinding, therefore, leaves relatively deep hollows in the ground surfaces (second sides 18) as a result of the elimination of larger particles.

Table 5 presents data from an experiment on the thickness of the protective film 50, the depth of hollows resulting from the elimination of particles, and corrosion resistance.

This experiment was performed using the same sample materials for the protective film 50 as in the experiment in FIG. 15. The bodies 10 were shaped from soft magnetic powders in which the average diameter of the larger particles was between 21 μm and 28 μm.

The thickness of the protective film 50 was measured as follows. That is, the body 10 was cut in parallel with its second sides 18 at the intersection of the diagonals of the top 14 of the inductor 1. The thickness of the protective film 50 on the upper and lower primary sides of the body 10 was measured at each quarter of the length L of the body 10 using a microscope at a magnification of ×1000 and averaged (second measurement). The average second measurement of ten inductors 1 was reported as measured thickness (average thickness). The microscope was Keyence Corporation's VHX-7000.

For corrosion resistance, "Fail" means the inductors 1 failed to meet predetermined quality criteria for corrosion resistance, and "Pass" means the inductors 1 met the quality criteria.

TABLE 5

| Average thickness [μm] | Depths of hollows [μm] | Average thickness/ depth of hollows | Corrosion resistance |
|---|---|---|---|
| 4 | 39 | 0.10 | Fail |
| 11 | 38 | 0.29 | Fail |
| 16 | 40 | 0.40 | Pass |
| 21 | 42 | 0.50 | Pass |
| 27 | 41 | 0.66 | Pass |
| 31 | 43 | 0.72 | Pass |
| 36 | 38 | 0.95 | Pass |

As can be seen from Table 5, the protective film 50 is prone to corrosion, and therefore is not of high quality enough, when it is thin for the depth of hollows resulting from the elimination of particles. The corrosion resistance is sufficiently high when the ratio of the thickness of the protective film 50 to the depth of the hollows is about 0.4 or more. Since the depth of the hollows is roughly equal to the average diameter of the larger particles, the protective film 50 is of high quality enough when its thickness is equal to or more than about 0.4 times the average diameter of the larger particles, even if particles have been eliminated from the surfaces therebeneath.

Overall, an inductor 1 according to an embodiment of the present disclosure has a body 10 containing soft magnetic powder and resins, a coil 30 embedded in the body 10, and outer electrodes 20 on the body 10 and also has a protective film 50 on the surface of the body 10. The protective film 50 has a thickness of about 10 μm or more and contains silica particles and resin. The silica particles have an average diameter between about 15 nm and about 75 nm, and the percentage by weight of the silica particles to the resin is between about 150% and about 250%.

The protective film 50 certainly protects the entire surface of the body 10 and prevents "plating marks" by virtue of having a thickness of about 10 μm or more.

The protective film 50 also helps prevent errors that can occur when the inductor 1 is visually inspected by optical testing as its gloss has been reduced by the silica particles therein.

The protective film 50, moreover, is of high quality without being damaged by "sticking." This is because the average diameter of the silica particles therein is between about 15 nm and about 75 nm and because the percentage by weight of the silica particles to the resin being between about 150% and about 250%.

In this embodiment, the thickness of the protective film 50 is smaller than or roughly equal to that of the outer electrodes 20. This ensures the outer electrodes 20 will not be interfered with by the thickness of the protective film 50 when coming into contact with a circuit on a circuit board.

In this embodiment, the protective film 50 contains carbon black. This improves the workability of the body 10 when the protective film 50 is removed by irradiation with a laser for the formation of the outer electrodes 20.

In this embodiment, the protective film 50 contains a phenoxy resin. This toughens the body 10.

In this embodiment, the protective film 50 contains a novolac resin. This makes the body 10 more resistant to heat.

In this embodiment, the thickness of the protective film 50 is equal to or more than about 0.4 times the average diameter of the larger particles. This ensures the protective film 50 is of high quality enough, even if particles have been eliminated from the surfaces therebeneath.

In this embodiment, the filler component may be titanium oxide, zirconium oxide, or aluminum oxide.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:
a body including soft magnetic powder and resin,
a coil embedded in the body,
outer electrodes on the body, and
a protective film on a surface of the body,
wherein the protective film has a thickness of 10 μm or more and includes silica particles and resin; and,
in the protective film, the silica particles have an average diameter of 15 nm to 75 nm, and a percentage by weight of the silica particles to the resin is between 150% and 250%.

2. The inductor according to claim 1, wherein
the thickness of the protective film is equal to or smaller than a thickness of the outer electrode.

3. The inductor according to claim 1, wherein
the protective film contains carbon black.

4. The inductor according to claim 1, wherein
the resin in the protective film contains a phenoxy resin.

5. The inductor according to claim 1, wherein
the resin in the protective film contains a novolac resin.

6. The inductor according to claim 2, wherein
the protective film contains carbon black.

7. The inductor according to claim 2, wherein
the resin in the protective film contains a phenoxy resin.

8. The inductor according to claim 3, wherein
the resin in the protective film contains a phenoxy resin.

9. The inductor according to claim 6, wherein
the resin in the protective film contains a phenoxy resin.

10. The inductor according to claim 2, wherein
the resin in the protective film contains a novolac resin.

11. The inductor according to claim 3, wherein
the resin in the protective film contains a novolac resin.

12. The inductor according to claim 4, wherein
the resin in the protective film contains a novolac resin.

13. The inductor according to claim 6, wherein
the resin in the protective film contains a novolac resin.

14. The inductor according to claim 7, wherein
the resin in the protective film contains a novolac resin.

15. The inductor according to claim 8, wherein
the resin in the protective film contains a novolac resin.

16. The inductor according to claim 9, wherein the resin in the protective film contains a novolac resin.

* * * * *